July 18, 1933.  D. S. FAULKNER ET AL  1,918,499
WATER DISTRIBUTING SYSTEM FOR DRAW WORKS
Original Filed Aug. 11, 1930  2 Sheets-Sheet 1
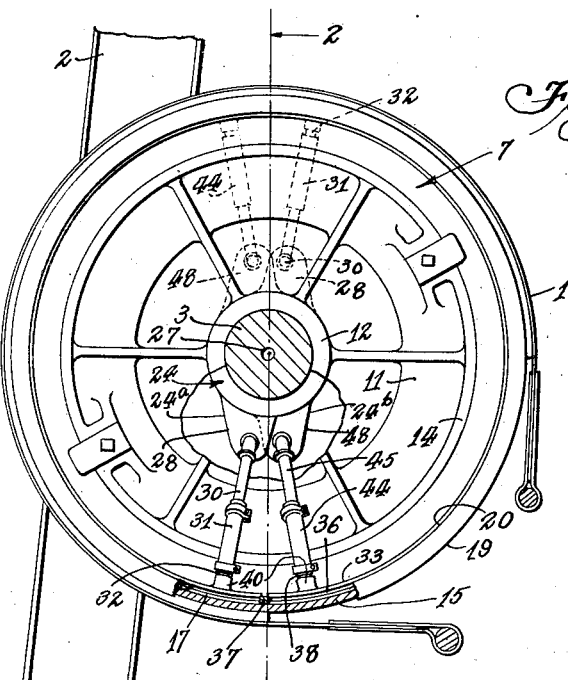
Inventors
David S. Faulkner
Lewis E. Zerbe
By Lyon & Lyon
Attorneys

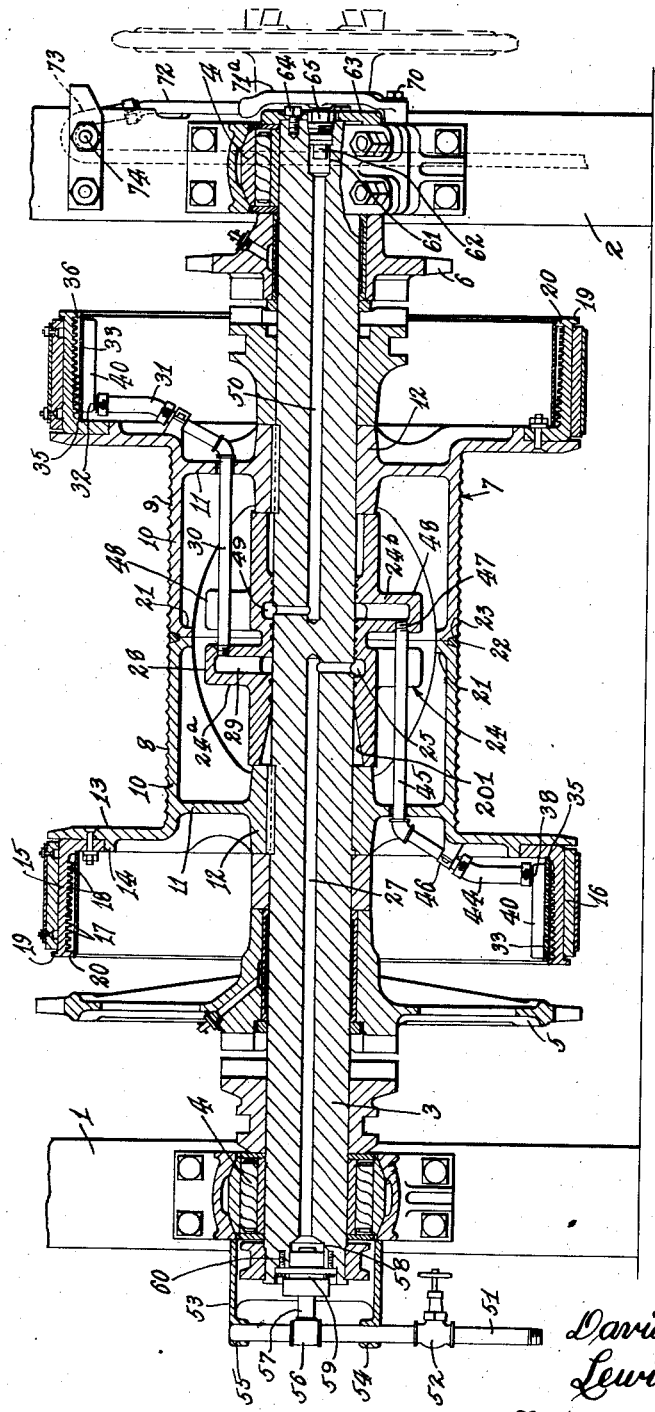
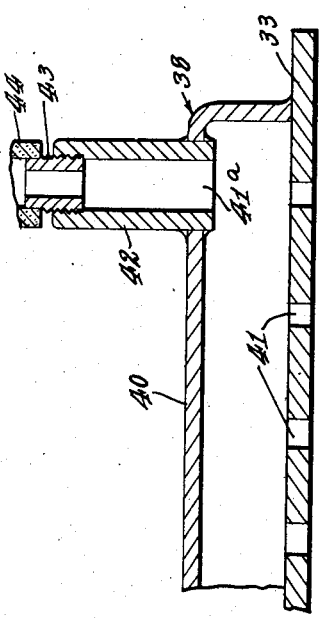
Fig. 5.
Fig. 6.
Inventors
David S. Faulkner
Lewis E. Zerbe
By Lyon & Lyon, Attorneys Patented July 18, 1933

1,918,499

UNITED STATES PATENT OFFICE

DAVID S. FAULKNER, OF LOS ANGELES, AND LEWIS E. ZERBE, OF MONETA, CALIFORNIA, ASSIGNORS TO THE NATIONAL SUPPLY COMPANY, OF TOLEDO, OHIO, A CORPORATION OF OHIO

WATER DISTRIBUTING SYSTEM FOR DRAW WORKS

Application filed August 11, 1930, Serial No. 474,549. Renewed May 13, 1932.

This invention relates to a water distributing system for drawworks and more particularly to an apparatus and system for distributing water to a pair of opposed brake rims secured to the drum of a hoisting apparatus or drawworks so as to cool the brake rims.

An object of this invention is to provide a system for distributing water to a pair of spaced brake rims of the drawworks through the shaft of the drawworks from a centrally disposed distributor and collector positioned within the drum of the drawworks.

Another object of this invention is to provide a hoisting drum construction including a distributor and collector and means connected with the distributor and collector for supplying a fluid thereto and for delivering the same under substantially equal pressure to the opposed brake rims of the drawworks and for conveying the fluid after it has been circulated to the spaced brake rims from the drawworks structure.

Other objects and advantages of this invention it is believed will be apparent from the following detailed description of a preferred embodiment thereof as illustrated in the accompanying drawings.

In the drawings:

Figure 1 is a side elevation partially in section of a fragment of a rotary drawworks drum illustrating our invention.

Figure 2 is a fragmental sectional elevation of the drawworks illustrating the water cooling distributing system embodying our invention as adapted thereto and taken substantially on the line 2—2 of Figure 1.

Figure 3 is a fragmental end elevation illustrating the manner of conveying the cooling fluid from the drawworks shaft structure.

Figure 4 is an enlarged fragmental sectional view of the liquid inlet means.

Figure 5 is an enlarged fragmental sectional view of the liquid outlet means.

Figure 6 is an enlarged fragmental sectional view of the cooling liquid outlet means from the brake rim cooling chambers, illustrating Venturi means provided for setting up a resistance to the discharge of the cooling liquid.

In the preferred embodiment of our invention illustrated in the accompanying drawings, 1 and 2 illustrate the posts of a drawworks upon which the drawworks shaft 3 is rotatably supported in bearings 4. The drawworks shaft 3 is driven in any suitable or desirable manner such, for example, as through either of the sprockets 5 or 6 from another shaft supported by the posts 1 and 2. Mounted on the shaft 3 is the drawworks drum 7 which is preferably of the following construction:

The drawworks drum is herein illustrated as composed of two half sections 8 and 9 which are joined together at the center of the drum 7 after the half sections have been assembled on the drum shaft 3. The half sections 8 and 9 of the drum 7 are of the same construction and each includes a half spool section 10 formed integral with an inwardly extending flange 11 which terminates in a bearing hub 12 extending longitudinally of the shaft 3. Each half section of the drum 7 likewise includes an upwardly extending annular flange 13 which is formed with an annular rib 14 upon which a brake rim 15 is fitted and secured in position by any suitable or desirable means.

Brake bands 16 which may be of any suitable or desirable construction are mounted upon the brake rims 15 and are adapted to be tightened to the brake rims 15 to form a brake for arresting the rotation of the drum 7. The brake rims 15 are provided on their inner periphery with alternately spaced annular ribs 17 and annular grooves 18 providing an increased surface at the interior of the brake rims so as to increase the heat transfer from the rims 15 to the cooling fluid circulated within the brake rims 15. The brake rims 15 at their outer periphery are provided with an upwardly extending guide flange 19 and a downwardly extending flange 20.

The two half sections 8 and 9 of the drum are provided at their adjoining ends with inwardly extending flanges 21 which are abutted together as the halves are assembled on the shaft 3, and the two half sections are then welded together by welding a metal 22 into the tapered recesses 23 formed between the abutting ends of the half sections 8 and 9.

Mounted within the interior of the brake drum 7 on the shaft 3, and prior to the assembly of the halves 8 and 9 of the brake drum 7 thereof, is a distributor and collector 24 for the distribution of a cooling fluid such, for example, as water to and from the brake rims 15.

There are provided in connection with the distributor and collector 24 a plurality of branch communications for delivering the cooling liquid to the brake rims, as will be more fully described hereinafter.

The distributor and collector 24 includes both the inlet manifold 24$^a$ and the outlet manifold 24$^b$ as formed of a casting including an inlet passage 25 which is formed on the inner periphery of the casting in position to register with an inlet duct 27 formed longitudinally of the shaft 3 and is formed with a pair of ears 28 having passages 29 formed therethrough which communicate at their ends with conduits 30 supported within the drums and which are coupled through flexible hose couplings 31 through inlets 32 formed in retaining fluid rings 33 secured in position within the brake rims 15. The retaining fluid rings 33 are secured in position on shoulders 35 formed on the inner surface of the rims 15 and on the edge of the inwardly extending flanges 20 by any suitable or desirable means such, for example, as welding the said retaining fluid rings in position.

The distributor and collector 24 is provided with a bore beveled at one end, as indicated at 201 to aid in the assembly of the distributor and collector on the shaft 3. The ends of the distributor and collector 24 when assembled on the shaft 3 engage the bearing hubs 12 which maintain the distributor and collector in position on the shaft 3.

The fluid retaining rings 33 are of such diameter as to provide between their outer periphery and the inner periphery of the brake rim 15 a cooling solution chamber 36 in which the cooling solution supplied from the inlet manifold 24$^a$ is circulated. A dam 37 is provided adjacent the inlet 32 across the chamber 36 as indicated at 37 for each brake rim 15 so that the cooling liquid or solution is caused to completely travel around the brake rim and pass out through the outlet 38 formed adjacent the inlet 30 and upon the opposite side of the dam 37.

The inlet 32 through which the cooling liquid is admitted from the conduit 30 is formed in a header box 40 which is secured to the cooling fluid retaining ring 33, and the cooling liquid flows from the header box 40 through a plurality of perforations 41 formed through the ring 33 within the header box 40.

In order to provide for resistance to the flow of the fluid from the chamber 36 after the fluid has been caused to circulate around the brake rim 15 in the chamber 36, the outlet 38 from the chamber 36 is formed through the header box 40 which is divided with an outlet port 41$^a$ in which a nipple 42 is mounted. The nipple 42 is provided at its outer end with a Venturi tube 43 which is screw-threaded in the end of the nipple 42 and is connected with a flexible conduit 44 which in turn is connected with a conduit 45 secured in position within the brake drum 7 by means of clamps 46 which pass through the inwardly extending flange 11 of the brake drums 7 and is secured to the inlet 47 of the outlet manifold 24$^b$. The outlet manifold 24$^b$ is provided with ears 48 similar to the inlet manifold ears 28 to which the liquid from the opposite brake rims 15 is delivered on substantially diametrically opposed sides of the shaft 3. The outlet manifold 24$^b$ is provided with an annular fluid outlet passage 49 which is in position to register with the outlet passage 50 formed longitudinally through the shaft 3.

Each brake rim 15 is cooled in the same manner and is provided with the same form of inlet and outlet means which is fed from the inlet manifold 24$^a$ and from which the solution or liquid is delivered to the outlet manifold 24$^b$.

The cooling liquid is delivered to the inlet port or passage 27 formed axially of the shaft 3 from a supply conduit 51 which is connected with any suitable supply of water under pressure. In order to regulate the flow of water to the brake rims, a valve 52 is interposed in the conduit 51.

In order to secure the inlet pipe in position, a supporting member 53 is secured to the post 1 and the inlet pipe 51 is passed therethrough as indicated at 54 and 55. A T 56 is mounted in the inlet pipe 51 and a branch pipe 57 is secured to the T and extends in a direction axially of the shaft 3. An enlarged chamber 58 is formed in the end of the shaft 3 and the branch pipe 57 extends into this chamber and is packed in position by a packing gland 59 which is secured as indicated at 60 to the shaft 3 so that it may rotate therewith and around the branch pipe 57.

The liquid passing from the outlet manifold 24$^b$ passes through the outlet passage 50 formed longitudinally of the shaft 3 into an enlarged chamber 61 formed in the opposite end of the shaft 3 and into which chamber 61 the outlet pipe nipple 62 extends.

A plate 63 is secured in position over the end of the shaft 3 by means of bolts 64 spaced around the end of the shaft 3. The plate 63 is separate from a sleeve 65 which extends into the enlarged chamber 61 and is threaded to the end of the shaft 3 as indicated at 66. The sleeve 65 engages packing 67 at its inner end, which packing 67 engages a ring 68 on its opposite face. The ring 68 is supported in position on a shoulder formed within the chamber 61 so that the packing 67 is compressed against the outlet nipple 62 to form a fluid tight joint permitting the shaft 3 to rotate around the nipple 2. Secured to the post 2 is an outlet passage member 71ª which is secured to the post 2 by means of bolts 70 at its lower end and extends vertically upward therefrom. The outlet passage member 71ª is provided with an outlet passage 71 into which the nipple 62 is screw-threaded. The outlet passage 71 is in communication with an outlet conduit 72 which is secured at opposite ends of the passage 71 and extends upward and is secured at its upper end to a flexible hose 73 which is passed over a clip 74 secured to the post 2. The opposite end of the hose 73 leads to any desired point of disposal of the liquid used to cool the brake rims 15. The hose 73 is extended over the clip 74 at a point elevated from the axis of the shaft 3 and preferably to a point near the level of the highest point of the chamber 36 formed around the brake rims 15 so as to maintain a head or back pressure on the liquid used to cool the brake rims so that the chamber 36 will at all times remain filled with the cooling liquid or water.

Having fully described our invention, it is to be understood that we do not wish to be limited to the details herein set forth, but our invention is of the full scope of the appended claims.

We claim:

1. In a rotary drawworks, the combination of a drum shaft, a drum supported on the drum shaft, a distributor and collector mounted within the drum, brake rims at the opposed ends of the drum, means for passing a cooling liquid to the distributor and collector, means for delivering the cooling liquid from the distributor and collector to the brake rims, means for returning the liquid to the distributor and collector, and means for conducting the liquid from the distributor and collector.

2. In a rotary drawworks, the combination of a drum shaft, a drum mounted thereon, brake rims at opposite ends of the drum, the drum including a spool section spaced from the shaft, cooling liquid inlet and outlet manifolds encircling the shaft within the space between the spool section and the shaft, means extending longitudinally of the shaft for conveying cooling liquid to said inlet manifold, means for conveying the cooling liquid from the inlet manifold to said brake rims, means for confining the cooling liquid within the brake rims, means for conveying the liquid from said brake rims to the outlet manifold, and means extending longitudinally of the shaft for conveying said liquid from the outlet manifold.

3. In a rotary drawworks, the combination of a drum shaft, a drum mounted thereon, a brake rim secured to the drum, a cooling liquid inlet manifold and a cooling liquid outlet manifold supported on and encircling the shaft, a cooling liquid inlet passage formed in the shaft for delivering cooling liquid to the inlet manifold, means for conducting the cooling liquid from the inlet manifold to the brake rim, means for conveying the cooling liquid from the brake rim to the outlet manifold, and means for conveying the cooling liquid from the outlet manifold.

4. In a rotary drawworks, the combination of a drum, a shaft supporting the drum, brake rims at the opposite ends of said drum, a cooling liquid distributor and collector within the drum, means for conveying the cooling liquid from the distributor and collector to the brake rims, means for circulating the cooling liquid around the brake rims, means for conveying the cooling liquid from the brake rims to the distributor and collector, and means for conveying the cooling liquid from the distributor and collector.

5. In a hoisting apparatus, the combination of a drum, a shaft supporting the drum, brake rims at opposite ends of said shaft, a cooling liquid distributor and collector within the drum, the shaft having a cooling liquid inlet passage formed longitudinally therein leading to the said distributor and collector from the end of said shaft, means for conveying the cooling liquid from the distributor and collector to the brake rims, means for circulating the cooling liquid around the brake rims, means for conveying the cooling liquid from the brake rims to the distributor and collector, and means for conveying the cooling liquid from the distributor and collector.

6. In a hoisting apparatus, the combination of a drum, a shaft supporting the drum, brake rims at opposite ends of said drum, a cooling liquid distributor and collector within the drum, the shaft having a cooling liquid inlet passage formed longitudinally therein from the end of said shaft to said distributor and collector, means for conveying the cooling liquid from the distributor and collector to the oppositely positioned brake rims, means for circulating the cooling liquid around the brake rims, means for conveying the cooling liquid from the brake rims to the distributor and collector, and the shaft having a cooling liquid outlet passage formed longitudinally therein from the distributor and collector to the end of said shaft.

7. In a hoisting apparatus, the combination of a drum, a shaft supporting the drum, brake rims at the opposite ends of said shaft, the drum having a spool portion spaced from the shaft, a cooling liquid distributor and collector within the spool section of the drum, means for conveying the cooling liquid from the distributor and collector to the brake rims, means for circulating the cooling liquid around the brake rims, means for conveying the cooling liquid to the distributor and collector, and means for conveying the cooling liquid from the distributor and collector.

8. In a rotary drawworks, the combination of a drum, a shaft supporting the drum, brake rims at the opposite ends of said drum, the drum having a spooling section spaced from the shaft, a cooling liquid distributor and collector mounted within the spooling section and supported on the shaft, means for conveying the cooling liquid from the distributor and collector to the brake rims, means for circulating the cooling liquid around the brake rims, means for conveying the cooling liquid from the brake rims to the distributor and collector, and means for conveying the cooling liquid from the distributor and collector.

9. In a rotary drawworks, the combination of a drum, a shaft supporting the drum, brake rims at the opposite ends of said drum, the drum having a spooling portion spaced from the shaft, a cooling liquid distributor and collector within the drum, a cooling liquid inlet formed longitudinally of the shaft to the distributor and collector, conduits extending from the distributor and collector to the oppositely positioned brake rims, means for circulating the cooling liquid around the brake rims, conduits extending from the brake rims for conveying the cooling liquid from the brake rims back to the distributor and collector, and a cooling liquid outlet passage formed longitudinally of the shaft for conveying the cooling liquid from the distributor and collector through the shaft.

10. In a rotary drawworks, the combination of a drum, a shaft supporting the drum, brake rims at the opposite ends of said drum, the drum being formed of two half sections, each including a half of the spooling portion of the drum, an end flange and a brake rim secured thereto, a cooling liquid distributor and collector positioned on the shaft, means for securing the half drum sections together over the cooling liquid distributor and collector, means for conveying the cooling liquid from the distributor and collector to the brake rims, means for circulating the cooling liquid around the brake rims, and means for conducting the cooling liquid from the brake rims.

11. In a rotary drawworks, the combination of a drum, a shaft supporting the drum, brake rims at the opposite ends of said drum, a cooling liquid distributor and collector within the drum, means for conveying the cooling liquid from the distributor and collector at the opposed brake rim, means for circulating the cooling liquid around the brake rims, means for conveying the cooling liquid from the brake rims to the distributor and collector, and means for conveying the cooling liquid from the distributor and collector, the latter said means including means for maintaining a back pressure on the cooling liquid.

12. In a rotary drawworks, the combination of a drum, a shaft supporting the drum, brake rims at opposite ends of said shaft, a cooling liquid distributor and collector within the drum, means for conveying the cooling liquid from the distributor and collector to the brake rims, a cooling fluid retaining ring secured in position spaced from the inner periphery of the brake rims to define a cooling fluid retaining chamber within the brake rim through which the cooling fluid is circulated around the brake rim, means for conveying the cooling liquid from the brake rims to the distributor and collector, and means for conveying the cooling liquid from the distributor and collector.

13. In a rotary drawworks, the combination of a drum, a shaft supporting the drum, brake rims at opposite ends of said shaft, a cooling liquid retaining ring secured to each brake rim, a cooling liquid distributor and collector within the drum, a cooling liquid outlet header box secured to the cooling fluid liquid retaining ring to which the means for conveying the cooling liquid from the brake rims to the distributor and collector is secured, the said securing means including a flow restricting plug, and means for conveying the cooling liquid from the distributor and collector.

14. In a rotary drawworks, the combination of a drum, a shaft supporting the drum, brake rims at the opposite ends of said drum, a cooling liquid distributor and collector within the drum, means for conveying the cooling liquid from the distributor and collector to the brake rims, a cooling liquid retaining ring positioned within the brake rims spaced from the brake rims to define a cooling liquid circulation chamber within the brake rims, a dam across the said chamber adjacent the cooling liquid inlet thereto, means adjacent the said dam for conveying the cooling liquid from said chamber to the distributor and collector, and means for conveying the cooling liquid from the distributor and collector.

15. In a rotary drawworks, the combination of a drum, a shaft supporting the drum, the drum being formed of half sections each of which section includes a half of the spooling portion of the drum, an inwardly extending annular flange terminating in a bearing hub, an upwardly extending and annular flange to which the brake rim is secured, a distributor and collector positioned on the shaft, and means for securing together the half sections of the spooling portion of the drum to confine the distributor and collector within the drum, means for conducting a cooling liquid to the distributor and collector conduits extending from the distributor and collector to the opposed brake rims, means for circulating the cooling liquid around the brake rims, conduits extending from the brake rims for conveying the cooling liquid back to the distributor and collector, and means for conveying the cooling liquid from the distributor and collector.

16. In a rotary drawworks, the combination of a drum, a shaft supporting the drum, brake rims at the opposite ends of said drum, a cooling liquid distributor and collector within the drum, a cooling liquid retaining ring positioned within the brake rims and spaced therefrom to provide a cooling liquid chamber within the periphery of the brake rim, the brake rims being formed with alternately spaced annular ribs and channels to increase the heat transfer surface at the interior of the brake rims, a dam across the chamber, means for conveying the cooling liquid from the distributor and collector to the brake rims on one side of the dam, means for conveying the cooling liquid away from the brake rims on the opposite sides of said dams back to the distributor and collector, and means for conveying the cooling liquid from the distributor and collector.

17. In a rotary drawworks, the combination of a drum, a shaft supporting the drum, brake rims at the opposite ends of said drum, a cooling liquid distributor and collector within the drum, cooling liquid retaining rings positioned within the brake rims and spaced therefrom to provide cooling liquid chambers within the peripheries of the brake rims, the brake rims being formed with alternately spaced annular ribs and channels to increase the heat transfer surface of the brake rims within said chambers, dams across the chambers, means for conveying the cooling liquid from the distributor and collector to the brake rims on one side of said dam, means for conveying the cooling liquid away from the brake rims on the opposite sides of said dams back to the distributor and collector, means for conveying the cooling liquid from the distributor and collector, and means between the brake rims and the distributor and collector for restricting the passage of the cooling liquid.

18. In a rotary drawworks, the combination of a drum, a shaft supporting the drum, the drum being formed of half sections, each of which includes a portion of the spooling area of the drum, an inwardly extending annular flange terminating in a bearing hub, and an upwardly extending annular flange to which a brake rim is secured, a distributor and collector positioned on the shaft, the distributor and collector being formed with an axial bore tapered at one end to receive the shaft and when assembled on the shaft engaging the adjacent ends of the bearing hubs, means for securing the half sections of the drum together to confine the distributor and collector within the drum, means for conducting a cooling liquid from the distributor and collector to the opposed brake rims, means for circulating the cooling liquid around the brake rims, means for returning the cooling liquid to the distributor and collector, and means for conveying the cooling liquid from the distributor.

19. In a rotary drawworks, the combination of a drumshaft, a drum mounted thereon, brake rims at the opposite ends of the drum, the drum including a spool section spaced from the shaft, cooling liquid inlet and outlet manifolds encircling the shaft and positioned within the space between the spool section and the shaft, means for conveying cooling liquid to said inlet manifold, means for conveying the cooling liquid from the inlet manifold to the brake rims, means for confining the cooling liquid within the brake rims, means for conveying the cooling liquid from the brake rims to the outlet manifold, and means for conveying said liquid from the outlet manifold.

20. In a rotary drawworks, the combination of a drum, a shaft supporting the drum, the drum being formed of half sections, each of which sections includes a portion of the spooling portion of the drum, an inwardly extending annular flange terminating in a bearing hub, an upwardly extending annular flange to which the brake rim is secured, a cooling liquid inlet manifold positioned on and encircling the shaft, a cooling liquid outlet manifold positioned on and encircling the shaft, means for securing the sections of the drum together to confine the manifolds within the drum, means for conducting a cooling liquid to the inlet manifold, conduits extending from the inlet manifold to the opposed brake rims, means for circulating the cooling liquid around the brake rims, conduits extending from the brake rims for conveying the cooling liquid to the outlet manifold, and means for conveying the cooling liquid from the outlet manifold.

21. In a rotary drawworks, the combination of a drum, a shaft supporting the drum, brake rims at the opposed ends of said drum, cooling liquid inlet and outlet manifolds within the drum, cooling liquid retaining rings positioned within the brake rims and spaced therefrom to provide cooling liquid chambers within the peripheries of the brake rims, the brake rim being formed of alternately spaced annular ribs and channels to increase the transfer surface at the interior of the brake rims, dams across the chambers, means for conveying the cooling liquid from the inlet manifold to the brake rims on one side of the dams, means for conveying the cooling liquid away from the brake rims on the opposite side of said dams back to the outlet manifold, and means for conveying the cooling liquid from the outlet manifold.

22. In a rotary drawworks, the combination of a drum shaft, a drum supported on the drum shaft, a cooling liquid inlet manifold mounted within the drum and encircling the shaft, brake rims at the opposed ends of the drum, means for passing a cooling liquid to the inlet manifold, means for delivering the cooling liquid from the inlet manifold to the brake rims, and means for conducting the cooling liquid from the brake rims.

23. In a hoisting apparatus, the combination of a drum, a shaft supporting the drum, a brake rim connected with said drum, said brake rim being formed of alternately spaced annular ribs and channels to increase the heat transfer surface at the inner periphery of the rim, a cooling liquid retaining ring positioned within and secured to the brake rim and spaced from a portion of the brake rim inner periphery to define a cooling liquid circulation chamber within the brake rim, and means for conveying a coolant to and from said circulating chamber.

24. In a rotary drawworks, the combination of a drum shaft, a drum supported on the drum shaft, a pair of spaced manifolds mounted within the drum and encircling the shaft, brake rims at the opposed ends of the drum, means for passing a cooling liquid to one of said manifolds, means for delivering the cooling liquid from the latter said manifold to the brake rims, means for returning the cooling liquid to the other manifold, and means for conducting the cooling liquid from the manifold.

25. In a rotary drawworks, the combination of a drum shaft, a drum secured to the shaft, brake rims at the opposite ends of the drum, spaced cooling liquid inlet and outlet manifolds mounted within the drum and encircling the shaft, means for passing a cooling liquid to the inlet manifold, means for conducting the cooling liquid from the inlet manifold to the opposed brake rims, means for retaining the cooling liquid within the brake rims, and means for conducting the cooling liquid from the brake rims back to the outlet manifold.

26. In a hoisting apparatus, the combination of a shaft, a drum mounted on the shaft, the drum having a brake rim, the shaft having cooling liquid inlet and outlet passages, means for conducting the cooling liquid to the shaft cooling liquid inlet, means for delivering liquid to the shaft inlet under pressure, means for conducting the liquid from the shaft, the latter said means extending upward to a point substantially on a level with the uppermost portion of the brake rim to retard the free flow of said liquid from the outlet.

27. In a hoisting apparatus, the combination of a drum shaft, a drum mounted thereon, the drum having a spooling portion spaced from the shaft, a brake rim secured to the drum, a cooling liquid distributor and collector supported on and encircling the shaft and within the space formed between the shaft and the spooling portion of the drum, a cooling liquid inlet passage provided within the shaft for delivering cooling liquid to the distributor, means for conducting the cooling liquid from the distributor to the brake rim, means for conveying the cooling liquid from the brake rim to the collector, and means for conveying the cooling liquid from the collector through an outlet passage provided within said shaft.

28. In a hoisting apparatus, the combination of a drum shaft, a drum mounted thereon, the drum having a spooling portion spaced from the shaft, a brake rim secured to the drum, a cooling liquid distributor and collector supported on and encircling the shaft and within the space formed between the shaft and the spooling portion of the drum, a cooling liquid inlet passage provided within the shaft for delivering cooling liquid to the distributor, means for conducting the cooling liquid from the distributor to the brake rim, means for conveying the cooling liquid from the brake rim to the collector, means for conveying the cooling liquid from the collector through an outlet passage provided within said shaft in which structure the shaft inlet and outlet passages are coaxially aligned.

29. In a hoisting apparatus, the combination of a drum shaft, a drum mounted thereon, the drum having a spooling portion spaced from the shaft, a brake rim secured to the drum, a combined integral coolant distributor and collector having separate inlet and outlet passages and being within the space formed between the shaft and the spooling portion of the drum, a cooling liquid inlet passage provided within the shaft, means forming a communication between the inlet passage formed in the distributor and the inlet passage of the shaft, means for conducting the cooling liquid from the inlet passage in said distributor to the brake rim, means for circulating the cooling liquid around the brake rim, means for conveying the cooling liquid from the brake rim to the outlet passage of the collector, and means for conveying the cooling liquid from the outlet passage through an outlet passage provided within said shaft.

30. In a hoisting apparatus, the combination of a drum shaft, a drum mounted thereon, the drum having a spooling portion spaced from the shaft, a brake rim secured to the drum, a combined integral coolant distributor and collector having separate inlet and outlet passages and being within the space formed between the shaft and the spooling portion of the drum, a cooling liquid inlet passage provided within the shaft, means forming a communication between the inlet passage formed in the distributor and the inlet passage of the shaft, means for conducting the cooling liquid from the inlet passage in said distributor to the brake rim, means for circulating the cooling liquid around the brake rim, means for conveying the cooling liquid from the brake rim to the outlet passage of the collector, means for conveying the cooling liquid from the outlet passage through an outlet passage provided within said shaft, and in which structure the inlet and outlet passages of the shaft are coaxially aligned.

31. In a rotary drawworks, the combination of a drum shaft, a spooling drum supported on the drum shaft, a plurality of brake rims mounted in non-rotative relation with the said spooling drum, a cooling liquid inlet manifold mounted within the spooling drum and encircling the shaft, means for passing a cooling liquid to the inlet manifold, means including a plurality of branch communications for delivering the cooling liquid from the inlet manifold to the brake rims, and means for conducting the cooling liquid from the brake rims.

32. In a rotary drawworks, the combination of a drum shaft, a spooling drum supported on the drum shaft, a plurality of brake rims mounted in non-rotative relation with said spooling drum, a cooling liquid inlet manifold mounted on and encircling the drum shaft, means for passing a cooling liquid to the inlet manifold, means including a plurality of branch communications for delivering the cooling liquid from the inlet manifold to the brake rims, and means for conducting the cooling liquid from the brake rims.

DAVID S. FAULKNER.
LEWIS E. ZERBE.